(12) United States Patent
Gidlow

(10) Patent No.: US 6,246,637 B1
(45) Date of Patent: Jun. 12, 2001

(54) METHOD AND SYSTEM FOR COMBINING THREE COMPONENT SEISMIC DATA

(75) Inventor: Maurice Gidlow, Haslum (NO)

(73) Assignee: PGS Tensor, Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/162,053

(22) Filed: Sep. 28, 1998

(51) Int. Cl.[7] .................................................. G01V 1/28
(52) U.S. Cl. .............................. 367/16; 367/22; 367/20; 367/46; 181/110
(58) Field of Search .............................. 367/21, 24, 45, 367/16, 26, 20, 22, 57, 13, 23, 46; 73/152, 51; 181/110, 120

(56) References Cited

U.S. PATENT DOCUMENTS

| | | |
|---|---|---|
| 4,486,865 | 12/1984 | Ruehle . |
| 4,752,916 | 6/1988 | Loewenthal . |
| 4,979,150 | 12/1990 | Barr . |
| 5,163,028 | 11/1992 | Barr et al. . |
| 5,235,554 | 8/1993 | Barr et al. . |
| 5,365,492 | 11/1994 | Dragoset, Jr. . |
| 5,396,472 | 3/1995 | Paffenholz . |
| 5,524,100 | 6/1996 | Paffenholz . |
| 5,621,700 | * 4/1997 | Moldoveanu ........................ 367/285 |
| 5,696,734 | 12/1997 | Corrigan . |

FOREIGN PATENT DOCUMENTS

WO 97/29390   8/1997   (WO) .

OTHER PUBLICATIONS

Greenhalgh, S.A., et al., Seismic wavefield separation by multicomponent tau–p polarisation filtering, Geophysics 173 (1990) 53–61.

Amundsen, Lasse, Decomposition of multicomponent sea-floor data into upgoing and downgoing P– and S– waves, Geophysics, vol. 60, No. 2 (Mar.–Apr. 1995) pp. 563–572.

* cited by examiner

Primary Examiner—Hezron Williams
Assistant Examiner—Anthony Jolly
(74) Attorney, Agent, or Firm—Arnold & Associates

(57) ABSTRACT

A system and method of processing seismic signals wherein seismic data resulting from a reflected seismic wave is received at a multi-component receiver. A mask trace is generated as a function of the seismic data received at the multi-component receiver, and a single type of seismic signals from the seismic data received at the multi-component receiver is identified and extracted utilizing the mask trace. Generating the mask trace further includes multiplying the seismic data received at two of the components of the multi-component receiver to produce a first result. A positive/negative sign of the first result is identified to produce a first binary result. The first binary result is divided by a scaling factor to produce the mask trace. Extracting the single type of seismic signals further includes multiplying the seismic data received at one component of the multicomponent receiver with the mask trace wherein the single type of seismic signals represents seismic waves received at the one component of the multi-component receiver. In another embodiment of the present invention, generating the mask trace further includes multiplying the seismic data received at two different components of the multi-component receiver to produce a second result. A positive/negative sign of the second result is identified to produce a second binary result. The second binary result is multiplied with the first binary result and then divided by a scaling factor to produce the mask trace.

73 Claims, 8 Drawing Sheets

METHOD AND SYSTEM FOR COMBINING THREE COMPONENT SEISMIC DATA

BACKGROUND OF THE INVENTION

1. Field of the Invention

This invention relates generally to seismic exploration and, more particularly to a system for separating compression waves from shear waves and up-going from down-going waves.

2. Description of the Related Art

A problem encountered in marine seismic surveying, as well as vertical seismic profiling, is that of water column reverberation, or multiple reverberation. Reverberations arise as a result of the inherent reflectivity of boundaries such as the water surface and bottom. A seismic wave generated in, or reflected off of, the earth's strata passes into the water in a generally up-going direction. This reflected wave of interest travels through the water and past the seismic detector or receiver, which records the wave. The wavefield continues upward to the water's surface where it is reflected back in a down-going direction. This reflected, or ghost, wavefield also travels through the water and past the receiver where it is again recorded. This reverberation of the seismic wavefield in the water obscures seismic data, amplifying certain frequencies and attenuating others, thereby making it difficult to analyze the underlying earth formations.

Ruehle, U.S. Pat. No. 4,486,865, incorporated herein by reference, discloses a seismic multiple suppression method employing inverse filters designed from the differing response characteristics of co-located hydrophones and geophones to primary and multiple seismic reflections. Loewenthal et al., U.S. Pat. No. 4,752,916, incorporated herein by reference, proposed the use of co-located hydrophones and geophones to estimate the source wavelet and then to use a deconvolution based on this wavelet to deghost the observed seismic data. Barr, U.S. Pat. No. 4,979,150, incorporated herein by reference, and Barr et al., U.S. Pat. No. 5,163,028, also incorporated herein by reference, disclose methods for reducing multiple reverberations in marine seismic reflection data by calibrating, scaling and summing together co-located hydrophone and geophone seismic data. Dragoset, U.S. Pat. No. 5,365,492, incorporated herein by reference, teaches an improved method of scaling the geophones to the hydrophones based on application of adaptive noise reduction techniques. Moldoveanu, U.S. Pat. No. 5,621,700, incorporated herein by reference, teaches an improved method of attenuation of reverberations by combining reverberation signals having identical amplitudes but opposite polarities wherein the reverberations are cancelled and only primary waves of interest remain.

These methods do not allow for multiple-free, single-component-type (e.g. hydrophone or geophone) data. Thus, there is a need for a process that will allow for a simple production of single-component-type sections.

SUMMARY OF THE INVENTION

According to a first aspect of the invention, a method for processing seismic signals, is provided, the method comprising:

reading seismic data received at a multi-component receiver;

generating a mask trace as a function of the seismic data; and identifying a single type of seismic signals from the seismic data utilizing the mask trace. In one embodiment, the seismic data received at a multi-component receiver includes pressure data received at a pressure sensor and velocity data received at a vertical component velocity detector.

In a more specific embodiment, the seismic data received at a multi-component receiver includes velocity data received at a horizontal component velocity detector.

In still another embodiment, the generating the mask trace further comprises: multiplying the seismic data received at the pressure sensor with the seismic data received at the vertical component velocity detector to produce a first result; identifying a positive/negative sign of the first result to produce a first binary result; and dividing the first binary result by a scaling factor to produce the mask trace. In one example embodiment, the identifying the single type of seismic signals further comprises: multiplying the pressure data received at the pressure sensor with the mask trace wherein the method for processing extracts the single type of seismic signals representing seismic waves received at the pressure sensor. In another example embodiment, the identifying the single type of seismic signals further comprises: multiplying the velocity data received at the vertical component velocity detector with the mask trace wherein the method for processing extracts the single type of seismic signals representing seismic waves received at the vertical component velocity detector.

In either such example embodiment, an additional option comprises displaying the single type of seismic signals remaining after the seismic waves are extracted.

In another more specific embodiment of the present aspect, the generating the mask trace further comprises: multiplying the seismic data received at the pressure sensor with the seismic data received at the vertical component velocity detector to produce a first result; identifying a positive/negative sign of the first result to produce a first binary result; multiplying the seismic data received at the vertical component velocity detector with the seismic data received at the horizontal component velocity detector to produce a second result; identifying a positive/negative sign of the second result to produce a second binary result; multiplying the first binary result with the a second binary result to produce a third result; and dividing the third result by a scaling factor to produce the mask trace.

Similar to an earlier described embodiment, in an additional option, the identifying the single type of seismic signals further comprises: multiplying the horizontal component velocity data received at the horizontal component velocity detector with the mask trace wherein the method for processing extracts the single type of seismic signals representing seismic waves received at the horizontal component velocity detector. In an alternative embodiment, the identifying the single type of seismic signals further comprises multiplying the pressure data received at the pressure sensor with the mask trace wherein the method for processing extracts the single type of seismic signals representing seismic waves received at the pressure sensor. In still a further alternative, the identifying the single type of seismic signals further comprises: multiplying the velocity data received at the vertical component velocity detector with the mask trace wherein the method for processing extracts the single type of seismic signals representing seismic waves received at the vertical component velocity detector. In any such alternatives, a further option is provided comprising displaying the single type of seismic signals remaining after the seismic waves received are extracted.

In still a further example of the present aspect of the invention, a further step is provided, comprising generating seismic waves in a water environment for reflection from earth strata wherein the seismic data results from the seismic waves. In an even further example, reading the seismic data further comprises: receiving the seismic data from the multi-component receiver; and recording the seismic data by a multi-channel seismic recording system. In any such example embodiments, example pressure sensors comprise hydrophones and example velocity detectors comprise geophones. Further, such examples operate in methods in which the seismic data represents compressional seismic waves, shear waves, and/or compressional to shear mode converted seismic waves.

In another aspect of the invention, a method for extraction of down-going seismic waves is provided, the method comprising:
  reading seismic data received at a multi-component receiver including pressure data received at a pressure sensor and velocity data received at a vertical component velocity detector;
  multiplying the pressure data and the velocity data to produce a first result;
  identifying a positive/negative sign of the first result to produce a binary result $\alpha$;
  dividing the binary result $\alpha$ by a scaling factor to produce a mask trace; and
  multiplying the seismic data received at one component of the multi-component receiver with the mask trace wherein the method for processing extracts the single type of seismic signals representing down-going seismic waves received at the one component of the multi-component receiver.

In one example, the identifying the positive/negative sign of the first result further comprises: taking the root mean square (rms) value of the first result to produce a first rms result; setting the first rms result to a value of one; summing the first rms result set to a value of one with a value of one to produce a first positive/negative sign result; and dividing the first positive/negative sign result by a factor of two to obtain the binary result $\alpha$. In a further example, the seismic data received at the one component of the multi-component receiver is the pressure data received at the pressure sensor wherein the method for processing extracts the single type of seismic signals representing down-going seismic waves received at the pressure sensor. Alternatively, the seismic data received at the one component of the multi-component receiver is the velocity data received at the vertical component velocity detector wherein the method for processing extracts the single type of seismic signals representing down-going seismic waves received at the vertical component velocity detector. In either case, an additional option comprises displaying the single type of seismic signals remaining after the down-going seismic waves received are extracted.

In a further example of the present aspect, another step is provided comprising generating seismic waves in a water environment for reflection from earth strata wherein the seismic data results from the seismic waves. And, in yet another example, reading the seismic data further comprises: receiving the seismic data from the multi-component receiver; and recording the seismic data by a multi-channel seismic recording system.

As before, example pressure sensors comprise hydrophones, and example velocity detectors comprise geophones. Further, such a method operates wherein the seismic data represents compressional seismic waves, shear waves, and compressional to shear mode converted seismic waves.

In still a further aspect of the invention, a method for extraction of up-going compressional seismic waves is provided, the method comprising:
  reading seismic data received at a multi-component receiver including pressure data received at a pressure sensor, vertical component velocity data received at a vertical component velocity detector, and horizontal component velocity data received at a horizontal component velocity detector;
  multiplying the pressure data and the vertical component velocity data to produce a first result;
  identifying a positive/negative sign of the first result to produce a binary result $\alpha$;
  multiplying the vertical component velocity data and the horizontal component velocity data to produce a second result;
  identifying a positive/negative sign of the second result to produce a binary result $\chi$;
  summing the binary result $\alpha$ with a value of positive one to produce a summed binary result $\alpha$;
  summing the binary result $\chi$ with a value of positive one to produce a summed binary result $\chi$;
  multiplying the summed binary result $\alpha$ with the summed binary result $\chi$ to produce a third result;
  dividing the third result by a scaling factor of four to produce a mask trace; and
  multiplying the seismic data received at one component of the multi-component receiver with the mask trace wherein the method for processing extracts the single type of seismic signals representing the up-going compressional seismic waves received at the one component of the multi-component receiver.

In one example embodiment, the identifying the positive/negative sign of the first result further comprises: taking the root mean square (rms) value of the first result to produce a first rms result; setting the first rms result to a value of one; summing the first rms result set to a value of one with a value of one to produce a first positive/negative sign result; and dividing the first positive/negative sign result by a factor of two to obtain the binary result $\alpha$. In a further, more specific embodiment, the identifying a positive/negative sign of the second result further comprises: taking the root mean square (rms) value of the second result to produce a second rms result; setting the second rms result to a value of one; summing the second rms result set to a value of one with a value of one to produce a second positive/negative sign result; and dividing the second positive/negative sign result by a factor of two to obtain the binary result $\chi$.

In another more specific embodiment, the seismic data received at the one component of the multi-component receiver is the pressure data received at the pressure sensor wherein the method for processing extracts the single type of seismic signals representing up-going compressional seismic waves received at the pressure sensor. Alternatively, the seismic data received at the one component of the multi-component receiver is the vertical component velocity data received at the vertical component velocity detector wherein the method for processing extracts the single type of seismic signals representing up-going compressional seismic waves received at the vertical component velocity detector. Or, as still another alternative, the seismic data received at the one component of the multi-component receiver is the horizontal component velocity data received at the horizontal component velocity detector wherein the method for processing extracts the single type of seismic signals representing up-going compressional seismic waves received at the horizontal component velocity detector. In any such alternatives, a further option comprises displaying the single type of seismic signals remaining after the up-going compressional seismic waves received at the horizontal component velocity detector are extracted.

In still another example embodiment, a further step is comprising generating seismic waves in a water environment for reflection from earth strata wherein the seismic data results from the seismic waves. While, in an even further example, a further step is provided which comprises: receiving the seismic data from the multi-component receiver; and recording the seismic data by a multi-channel seismic recording system.

In yet another aspect of the present invention, a method for processing seismic signals for extraction of up-going shear seismic waves is provided, the method comprising:

reading seismic data received at a multi-component receiver including pressure data received at a pressure sensor, vertical component velocity data received at a vertical component velocity detector, and horizontal component velocity data received at a horizontal component velocity detector;

multiplying the pressure data and the vertical component velocity data to produce a first result;

identifying a positive/negative sign of the first result to produce a binary result $\alpha$;

multiplying the vertical component velocity data and the horizontal component velocity data to produce a second result;

identifying a positive/negative sign of the second result to produce a binary result $\chi$;

summing the binary result $\alpha$ with a value of positive one to produce a summed binary result $\alpha$;

subtracting the binary result $\chi$ from a value of positive one to produce a subtracted binary result $\chi$;

multiplying the summed binary result $\alpha$ with the subtracted binary result $\chi$ to produce a third result;

dividing the third result by a scaling factor of four to produce a mask trace; and multiplying the seismic data received at one component of the multi-component receiver with the mask trace wherein the method for processing extracts the single type of seismic signals representing the up-going shear seismic waves received at the one component of the multi-component receiver.

In one example of such a method, the identifying the positive/negative sign of the first result further comprises:

taking the root mean square (rms) value of the first result to produce a first rms result; setting the first rms result to a value of one; summing the first rms result set to a value of one with a value of one to produce a first positive/negative sign result; and dividing the first positive/negative sign result by a factor of two to obtain the binary result $\alpha$.

In another example, the identifying a positive/negative sign of the second result further comprises: taking the root mean square (rms) value of the second result to produce a second rms result; setting the second rms result to a value of one; summing the second rms result set to a value of one with a value of one to produce a second positive/negative sign result; and dividing the second positive/negative sign result by a factor of two to obtain the binary result $\chi$.

In still a further example, the seismic data received at the one component of the multi-component receiver is the pressure data received at the pressure sensor wherein the method for processing extracts the single type of seismic signals representing up-going shear seismic waves received at the pressure sensor. Alternatively, the seismic data received at the one component of the multi-component receiver is the vertical component velocity data received at the vertical component velocity detector wherein the method for processing extracts the single type of seismic signals representing up-going shear seismic waves received at the vertical component velocity detector. As still a further alternatively, the seismic data received at the one component of the multi-component receiver is the horizontal component velocity data received at the horizontal component velocity detector wherein the method for processing extracts the single type of seismic signals representing up-going shear seismic waves received at the horizontal component velocity detector. In any such alternatives, as a further option or step is provided comprising: displaying the single type of seismic signals remaining after the up-going shear seismic waves received are extracted.

According to still a further aspect of the invention, a system for processing seismic signals, the system comprising: a means for reading seismic data received at a multi-component receiver; a means for generating a mask trace as a function of the seismic data; and a means for identifying a single type of seismic signals from the seismic data utilizing the mask trace.

According to our example of this aspect, the seismic data received at a multicomponent receiver includes pressure data received at a pressure sensor and velocity data received at a vertical component velocity detector, and the seismic data received at a multi-component receiver includes velocity data received at a horizontal component velocity detector.

In a more specific example, the means for generating the mask trace further comprises: a means for multiplying the seismic data received at the pressure sensor with the seismic data received at the vertical component velocity detector to produce a first result; a means for identifying a positive/negative sign of the first result to produce a first binary result; and a means for dividing the first binary result by a scaling factor to produce the mask trace.

In an even more specific example embodiment, the means for identifying the single type of seismic signals further comprises: a means for multiplying the pressure data received at the pressure sensor with the mask trace wherein the system for processing extracts the single type of seismic signals representing seismic waves received at the pressure sensor. Alternatively, the means for identifying the single type of seismic signals further comprises: a means for multiplying the velocity data received at the vertical component velocity detector with the mask trace wherein the system for processing extracts the single type of seismic signals representing seismic waves received at the vertical component velocity detector. In either alternative, a means for displaying may also be provided for displaying the single type of seismic signals remaining after the seismic waves received are extracted.

In still another example, the means for generating the mask trace further comprises: a means for multiplying the seismic data received at the pressure sensor with the seismic data received at the vertical component velocity detector to produce a first result; a means for identifying a positive/ negative sign of the first result to produce a first binary result; a means for multiplying the seismic data received at the vertical component velocity detector with the seismic data received at the horizontal component velocity detector to produce a second result; a means for identifying a positive/negative sign of the second result to produce a second binary result; a means for multiplying the first binary result with the second binary result to produce a third result; and a means for dividing the third result by a scaling factor to produce the mask trace.

In a more specific embodiment, the means for identifying the single type of seismic signals further comprises: a means for multiplying the velocity data received at the horizontal component velocity detector with the mask trace wherein the system for processing extracts the single type of seismic signals representing seismic waves received at the horizontal component velocity detector. Alternatively the means for identifying the single type of seismic signals further comprises: a means for multiplying the pressure data received at the pressure sensor with the mask trace wherein the system for processing extracts the single type of seismic signals representing seismic waves received at the pressure sensor; or, the means for identifying the single type of seismic signals further comprises: a means for multiplying the velocity data received at the vertical component velocity detector with the mask trace wherein the system for processing extracts the single type of seismic signals representing seismic waves received at the vertical component velocity detector. In any such alternatives, there is provided a means for displaying the single type of seismic signals remaining after the seismic waves received at the vertical component velocity detector are extracted.

In still a further example embodiment, there is further provided, a means for generating seismic waves in a water environment for reflection from earth strata wherein the seismic data results from the seismic waves. In yet another example embodiment, the means for reading the seismic data further comprises: a means for receiving the seismic data from the multi-component receiver; and a means for recording the seismic data by a multi-channel seismic recording system.

In still a further aspect of the invention, a system for processing seismic signals for extraction of down-going seismic waves is provided, the system comprising:

a means for reading seismic data received at a multi-component receiver including pressure data received at a pressure sensor and velocity data received at a vertical component velocity detector;

a means for multiplying the pressure data and the velocity data to produce a first result;

a means for identifying a positive/negative sign of the first result to produce a binary result $\alpha$;

a means for dividing the binary result $\alpha$ by a scaling factor to produce a mask trace; and a means for multiplying the seismic data received at one component of the multicomponent receiver with the mask trace wherein the system for processing extracts the single type of seismic signals representing down-going seismic waves received at the one component of the multi-component receiver.

According to one example of the present aspect, the means for identifying the positive/negative sign of the first result further comprises: a means for taking the root mean square (rms) value of the first result to produce a first rms result; a means for setting the first rms result to a value of one; a means for summing the first rms result set to a value of one with a value of one to produce a first positive/negative sign result; and a means for dividing the first positive/negative sign result by a factor of two to obtain the binary result $\alpha$.

According to a more specific example, the seismic data received at the one component of the multi-component receiver is the pressure data received at the pressure sensor wherein the system for processing extracts the single type of seismic signals representing down-going seismic waves received at the pressure sensor. Alternatively the seismic data received at the one component of the multi-component receiver is the velocity data received at the vertical component velocity detector wherein the system for processing extracts the single type of seismic signals representing down-going seismic waves received at the vertical component velocity detector. In either alternative a means may be provided for displaying the single type of seismic signals remaining after the down-going seismic waves are extracted.

In still a further example, there is provided a means for generating seismic waves in a water environment for reflection from earth strata wherein the seismic data results from the seismic waves. In yet another example, of the means for reading the seismic data further comprises: a means for receiving the seismic data from the multi-component receiver; and a means for recording the seismic data by a multi-channel seismic recording system.

According to still a further aspect of the invention, a system for processing seismic signals for extraction of up-going compressional seismic waves is provided, the system comprising:

a means for reading seismic data received at a multi-component receiver including pressure data received at a pressure sensor, vertical component velocity data received at a vertical component velocity detector, and horizontal component velocity data received at a horizontal component velocity detector;

a means for multiplying the pressure data and the vertical component velocity data to produce a first result;

a means for identifying a positive/negative sign of the first result to produce a binary result $\alpha$;

a means for multiplying the vertical component velocity data and the horizontal component velocity data to produce a second result;

a means for identifying a positive/negative sign of the second result to produce a binary result $\chi$;

a means for summing the binary result $\alpha$ with a value of positive one to produce a summed binary result $\alpha$;

a means for summing the binary result $\chi$ with a value of positive one to produce a summed binary result $\chi$;

a means for multiplying the summed binary result $\alpha$ with the summed binary result $\chi$ to produce a third result;

a means for dividing the third result by a scaling factor of four to produce a mask trace; and a means for multiplying the seismic data received at one component of the multicomponent receiver with the mask trace wherein the system for processing extracts the single type of seismic signals representing the up-going compressional seismic waves received at the one component of the multicomponent receiver.

According to an example of the present aspect, the means for identifying the positive/negative sign of the first result further comprises: a means for taking the root mean square (rms) value of the first result to produce a first rms result; a means for setting the first rms result to a value of one; a means for summing the first rms result set to a value of one with a value of one to produce a first positive/negative sign result; and a means for dividing the first positive/negative sign result by a factor of two to obtain the binary result $\alpha$.

In yet another aspect, the means for identifying a positive/negative sign of the second result further comprises: a means for taking the root mean square (rms) value of the second result to produce a second rms result; a means for setting the second rms result to a value of one; a means for summing the second rms result set to a value of one with a value of one to produce a second positive/negative sign result; and a means for dividing the second positive/negative sign result by a factor of two to obtain the binary result $\chi$.

In still a further example, the seismic data received at the one component of the multi-component receiver is the pressure data received at the pressure sensor wherein the system for processing extracts the single type of seismic signals representing up-going compressional seismic waves received at the pressure sensor. Alternatively, the seismic data received at the one component of the multi-component receiver is the vertical component velocity data received at the vertical component velocity detector wherein the system for processing extracts the single type of seismic signals representing up-going compressional seismic waves received at the vertical component velocity detector. In yet another alternative, the seismic data received at the one component of the multicomponent receiver is the horizontal component velocity data received at the horizontal component velocity detector wherein the system for processing extracts the single type of seismic signals representing up-going compressional seismic waves received at the horizontal component velocity detector. In any such alternative, there is provided a means for displaying the single type of seismic signals remaining after the up-going compressional seismic waves received are extracted.

In yet another example, there is provided a means for generating seismic waves in a water environment for reflection from earth strata wherein the seismic data results from the seismic waves.

According to still another aspect of the invention there is provided a system for processing seismic signals for extraction of up-going shear seismic waves, the system comprising:

a means for reading seismic data received at a multi-component receiver including pressure data received at a pressure sensor, vertical component velocity data received at a vertical component velocity detector, and horizontal component velocity data received at a horizontal component velocity detector;

a means for multiplying the pressure data and the vertical component velocity data to produce a first result;

a means for identifying a positive/negative sign of the first result to produce a binary result $\alpha$;

a means for multiplying the vertical component velocity data and the horizontal component velocity data to produce a second result;

a means for identifying a positive/negative sign of the second result to produce a binary result $\chi$;

a means for summing the binary result $\alpha$ with a value of positive one to produce a summed binary result $\alpha$;

a means for subtracting the binary result $\chi$ from a value of positive one to produce a subtracted binary result $\chi$;

a means for multiplying the summed binary result $\alpha$ with the subtracted binary result $\chi$ to produce a third result;

a means for dividing the third result by a scaling factor of four to produce a mask trace; and a means for multiplying the seismic data received at one component of the multicomponent receiver with the mask trace wherein the system for processing extracts the single type of seismic signals representing the up-going shear seismic waves received at the one component of the multi-component receiver.

In one example, the means for identifying the positive/negative sign of the first result further comprises: a means for taking the root mean square (rms) value of the first result to produce a first rms result; a means for setting the first rms result to a value of one; a means for summing the first rms result set to a value of one with a value of one to produce a first positive/negative sign result; and a means for dividing the first positive/negative sign result by a factor of two to obtain the binary result $\alpha$.

In yet another example, the means for identifying a positive/negative sign of the second result further comprises: a means for taking the root mean square (rms) value of the second result to produce a second rms result; a means for setting the second rms result to a value of one; a means for summing the second rms result set to a value of one with a value of one to produce a second positive/negative sign result; and a means for dividing the second positive/negative sign result by a factor of two to obtain the binary result $\chi$.

In still another example, the seismic data received at the one component of the multi-component receiver is the pressure data received at the pressure sensor wherein the system for processing extracts the single type of seismic signals representing up-going shear seismic waves received at the pressure sensor. Alternatively, the seismic data received at the one component of the multi-component receiver is the vertical component velocity data received at the vertical component velocity detector wherein the system for processing extracts the single type of seismic signals representing up-going shear seismic waves received at the vertical component velocity detector. According to still another alternative, the seismic data received at the one component of the multi-component receiver is the horizontal component velocity data received at the horizontal component velocity detector wherein the system for processing extracts the single type of seismic signals representing up-going shear seismic waves received at the horizontal component velocity detector. In any such alternative, is provided a means for displaying the single type of seismic signals remaining after the up-going shear seismic waves received at the horizontal component velocity detector are extracted.

In yet another example, there is further provided a means for generating seismic waves in a water environment for reflection from earth strata wherein the seismic data results from the seismic waves.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF EXAMPLE EMBODIMENTS

Figure 1:
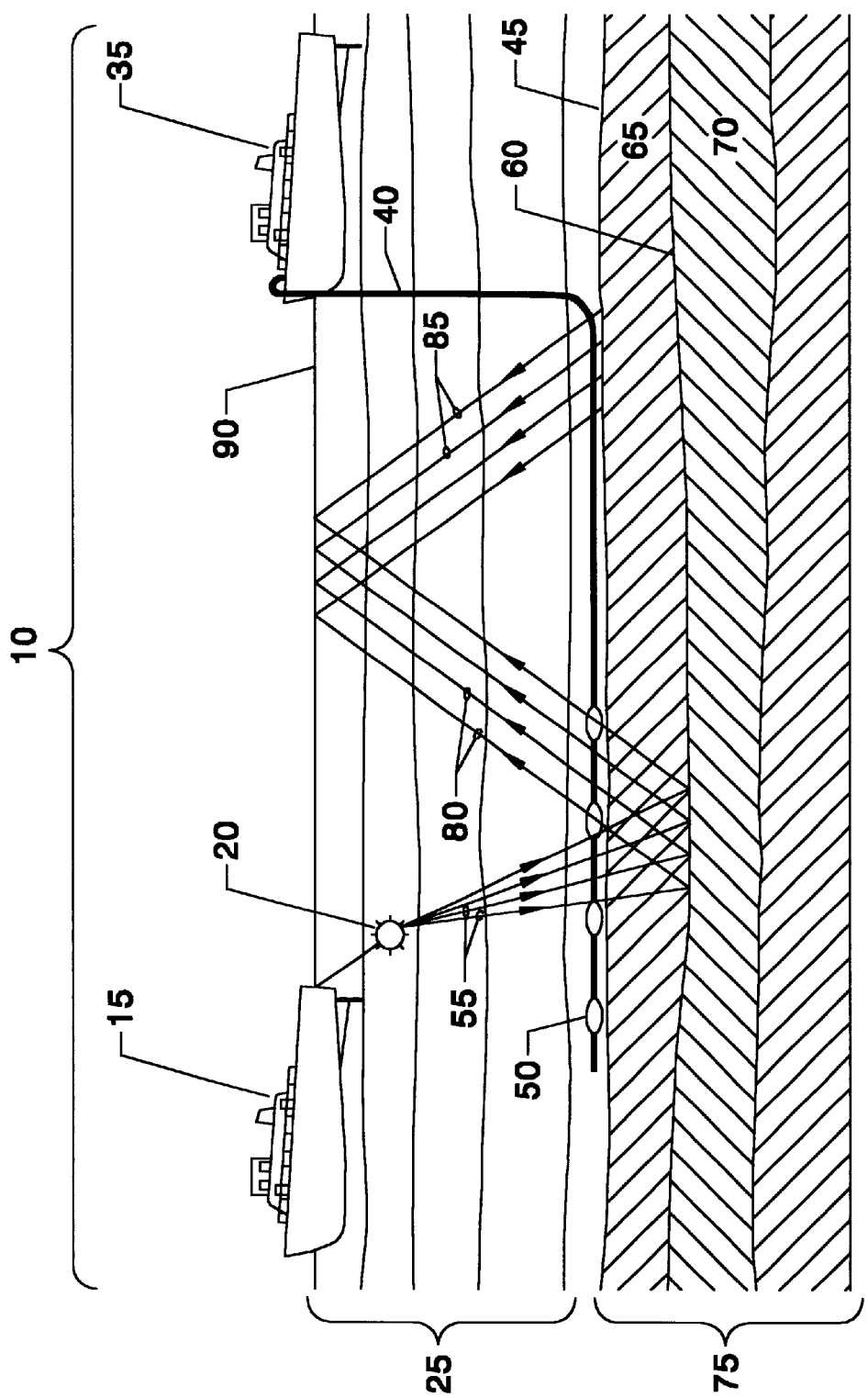
FIG. 1 illustrates a marine seismic survey system including a bottom cable operation.

FIG. 1 illustrates an example embodiment in which a marine seismic survey system 10 is provided, including a seismic survey ship 15 for towing a seismic energy source 20 through a body of water 25. The seismic energy source 20 comprises, in one example embodiment, an acoustic energy source. In another embodiment, an array of such sources is used. The source 20 is constructed and operated in a manner conventional in the art. The marine seismic survey system 10 also includes a receiving ship 35 that, in the illustrated embodiment, is anchored in the body of water 25, although anchoring is not required by the present invention. The receiving ship 35 deploys a cable 40 on the marine bottom 45, and receives signals from the cable 40. The cable 40 carries at least one receiver 50, but preferably carries a plurality of such units.

In the present embodiment, the receiver 50 comprises a multi-component receiver that includes, for example, a pressure sensor, such as a hydrophone, for sensing water pressure, and a velocity detector, such as a multi-component geophone, for detecting water bottom particle velocity. Further, the receiver 50 has a vertical component and a horizontal component. In alternative embodiments, the velocity detector comprises a single component geophone having a vertical component or a horizontal component (e.g., an in-line or cross-line geophone). Typically, the hydrophones and geophones are arranged in identical spatial arrays when deployed on the marine bottom 45. Also in some embodiments each individual hydrophone has a gimbaled geophone positioned adjacent to the hydrophone. The survey ship 15 fires the source 20 at predetermined intervals and locations while the signals resulting from source 20 are detected at the hydrophone and geophone arrays deployed on the marine bottom 45. A separate electrical signal is sent to a recording system on the ship 35 for each hydrophone and each geophone. These signals are typically referred to as seismic signal reflection data or simply seismic data. The seismic data is recorded by a multi-channel seismic recording system that selectively amplifies, conditions, and records time-varying electrical signals onto, for example, magnetic tape. The received signals are typically also digitized (for example, using a 14 bit analog-to-digital converter) to facilitate analysis. The received signals are also typically displayed. Processing and display of the seismic signal data is, for example, performed on the receiving ship 35 or at a separate location using the recorded data. However, those skilled in the art will recognize that any one of a variety of seismic recording and displaying systems can be used.

In a more specific example, in which the cable 40 and receivers 50 are positioned on the marine bottom 45 for use in three dimensional, "bottom cable" operations, the source 20 is fired, or "shot", with the survey ship 15 moving at a constant speed along a set of parallel lines with respect to the cable 40. The receiving ship 35 then retrieves the cable 40, and re-deploys the cable 40 in a line spaced from, but parallel to, the previous cable location. Once the cable 40 is re-deployed, the survey ship 15 shoots another line.

During data collection, seismic waves generated by the source 20 travel downwardly (down-going seismic waves) as indicated by the primary waves shown as rays 55. These primary waves are reflected off of interfaces between earth strata, such as the interface 60 between strata 65 and 70, in the earth formation 75. The reflected waves traveling upwardly (up-going seismic waves) are the reflected waves of interest and are illustrated as rays 80. Reverberated waves, shown as rays 85, are reflected waves that reflect off of the water-air interface 90 at the surface of the water 25 and travel downwardly (also down-going seismic waves) in the water 25 to impinge on the receivers 50. The receivers 50 (the hydrophone and geophone pairs) detect the reflected waves of interest, as well as the primary waves and multiple reverberated waves. The receivers 50 generate electrical signals representative of pressure and particle velocity changes inherent to the wave field, and transmit the generated electrical signals to the survey ship 35 via the cable 40. The recording equipment within the ship 35 records the electrical signals to be subsequently processed to map the earth formation 75. The receiver array 50 is located near a free surface such as the air-water interface 90. However, during the recording of seismic waves in vertical seismic profiling, for example, multiple reverberated waves can be reflected from other free surfaces such as the boundary between air and ground on the earth's surface, or at the boundary between water and the sea floor on the bottom of a body of water.

In accordance with one example embodiment of the present invention, the seismic signals are processed wherein a single type of seismic signal is extracted from the seismic data received at the multi-component receiver. A mask trace is generated as a function of the seismic data received at the multi-component receiver. The single type of seismic signal represents either up-going or down-going seismic waves received at one component of the multi-component receiver. For example, in one embodiment, the extracted seismic signal represents the down-going seismic waves received at one component of the multi-component receiver. In another embodiment, the extracted seismic signal represents the up-going compressional seismic waves received at one component of the multi-component receiver. In still another embodiment, the extracted seismic signal represents the up-going shear seismic waves received at one component of the multi-component receiver. The seismic signals are extracted at the hydrophone, at the vertical component geophone, or at the horizontal component geophone, providing quality control in processing of the seismic signal data and aiding in seismic data interpretation.

Figure 2A:
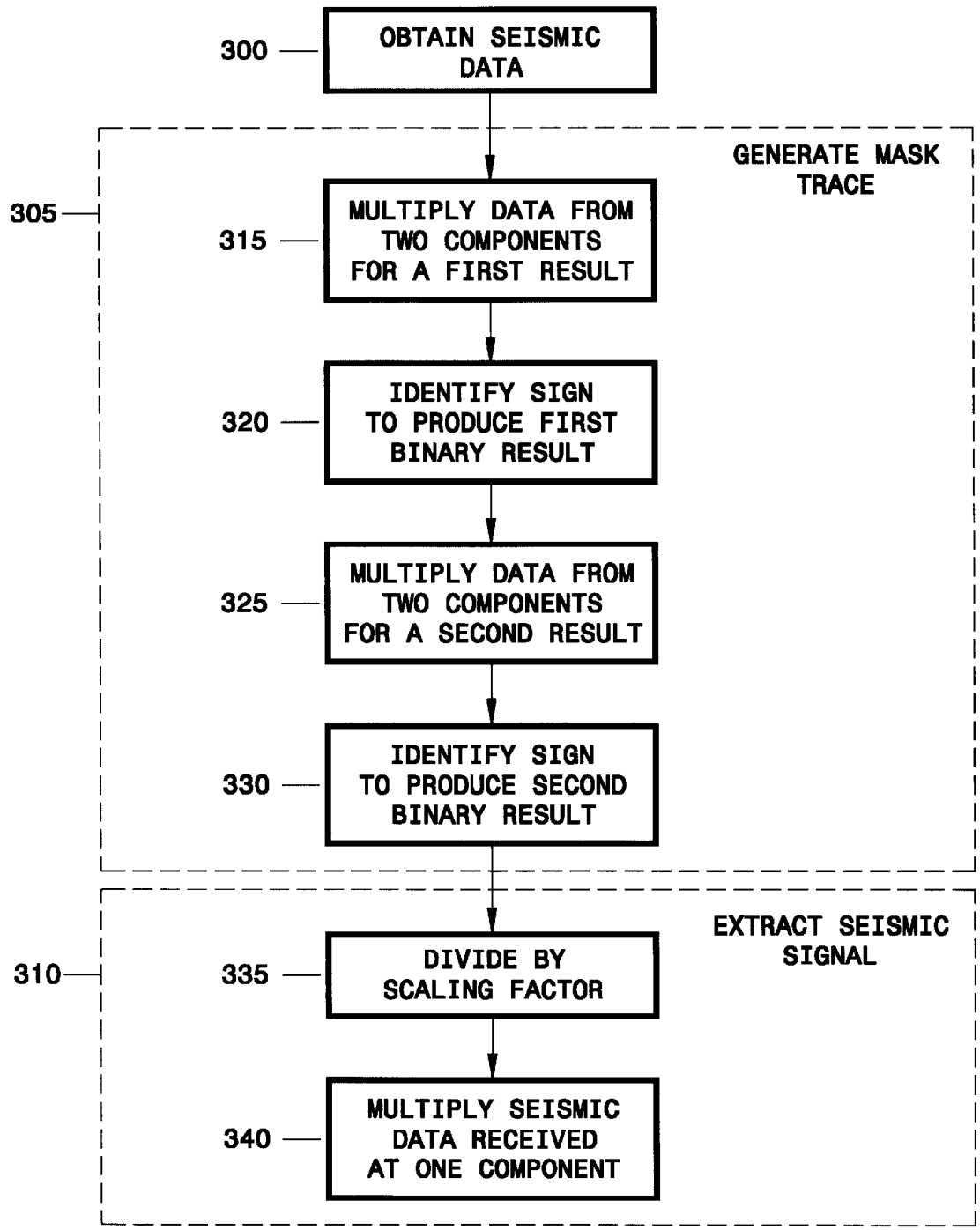
FIGS. 2A–2D are flow charts illustrating various embodiments of the system and method of the present invention.
Figure 2B:
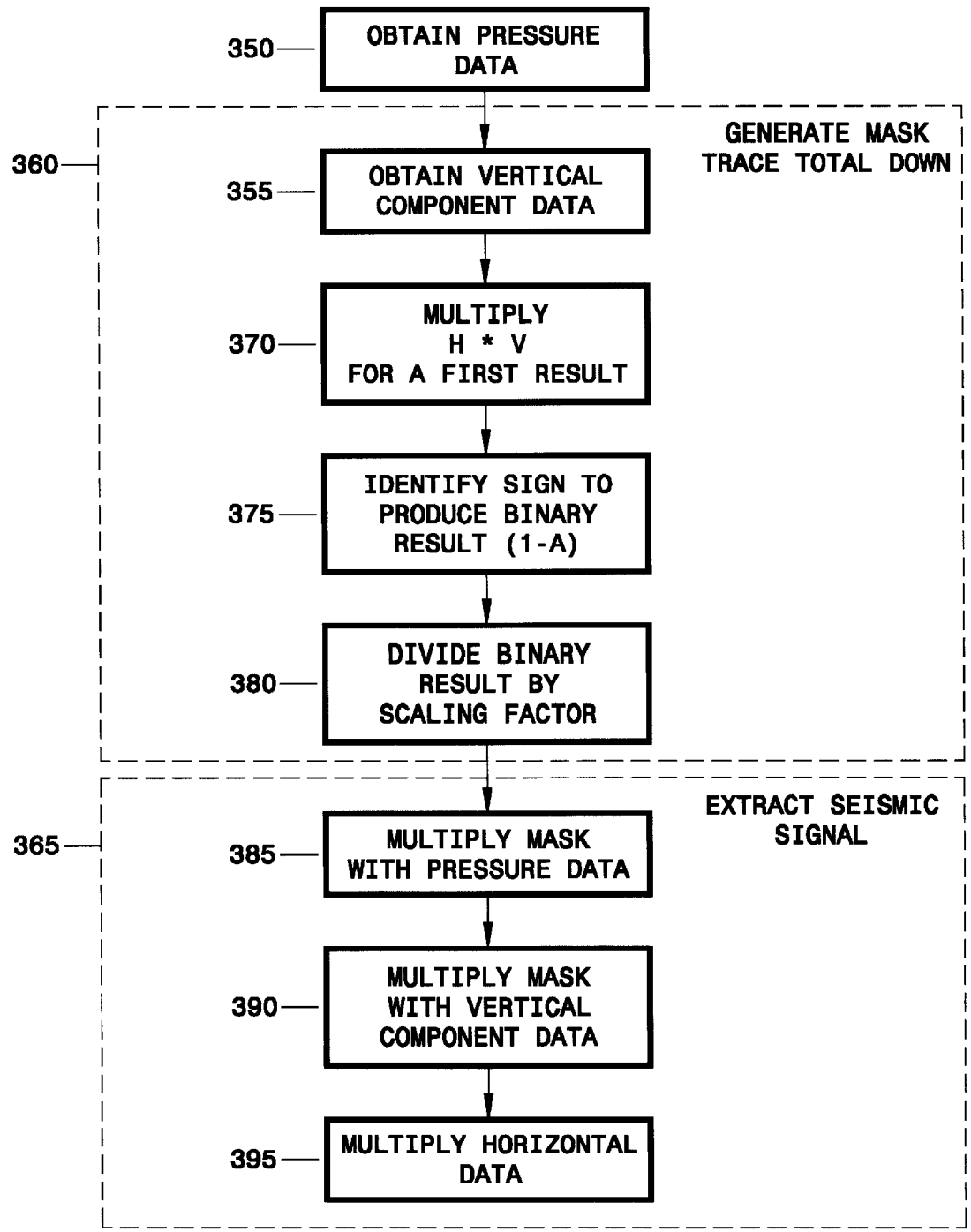
Figure 2C:
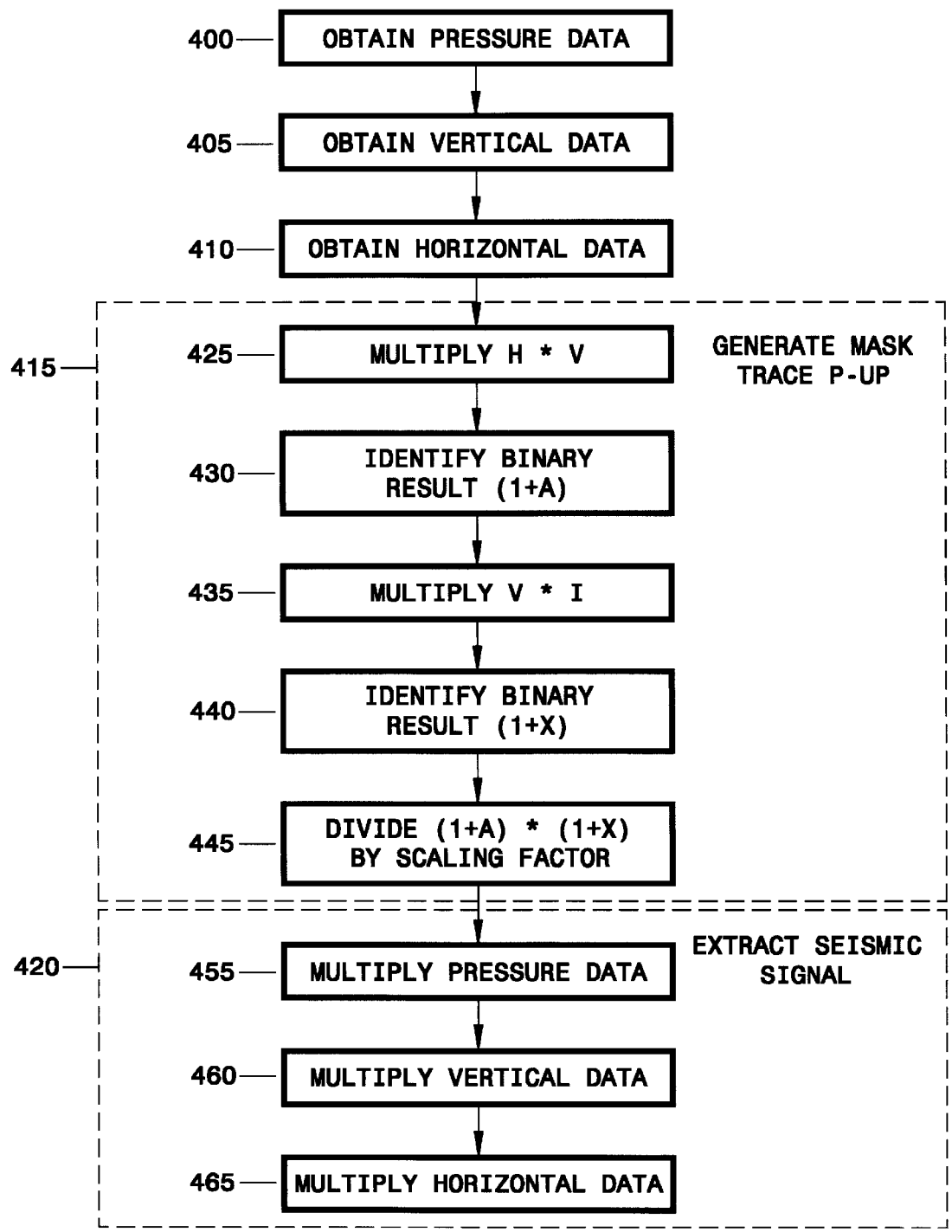
Figure 2D:
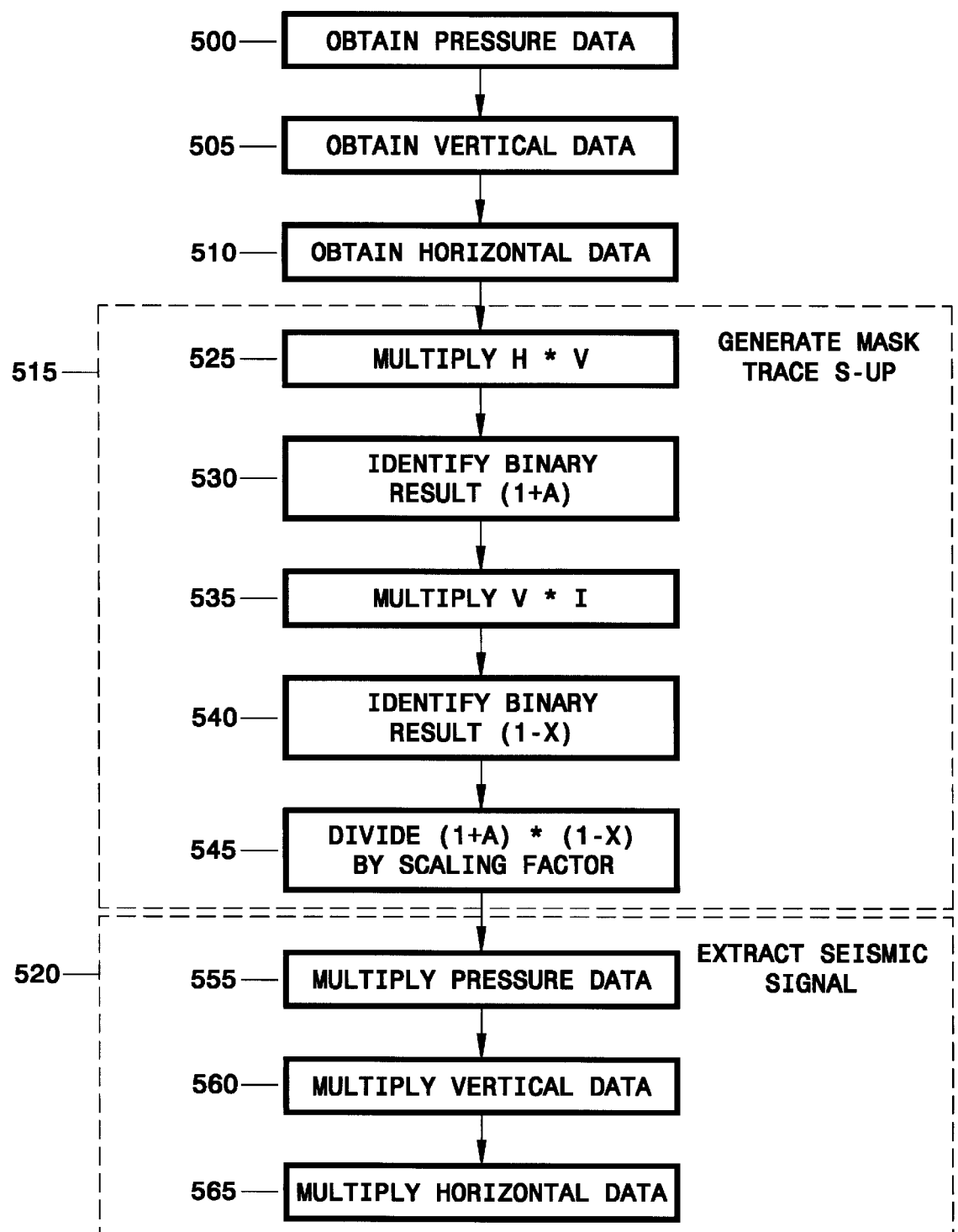

The system and method of the present invention is described in greater detail in the flow-charts of FIGS. 2A–2D. FIGS. 2B–2D are flowcharts illustrating an example of the system and method of the present invention wherein the down-going seismic waves received at one component are extracted from the seismic data received at the multi-component receiver (FIG. 2B), the up-going compressional seismic waves received at one component are extracted from the seismic data received at the multi-component receiver (FIG. 2C), and the up-going shear seismic waves received at one component are extracted from the seismic data received at the multi-component receiver (FIG. 2D). The method of the present invention also provides for identification of a single type of seismic signal from the seismic data received at the multi-component receiver.

In FIG. 2A, at block 300, seismic data is obtained resulting from generating a reflected seismic wave and receiving the seismic wave at a multi-component receiver. The multi-component receiver includes, for example, a pressure sensor for receiving pressure data, a vertical component velocity detector for receiving vertical component velocity data, and a horizontal component velocity detector for receiving horizontal component velocity data. At section 305, the system includes a means for generating a mask trace as a function of the seismic data received at the multi-component receiver. At section 310, the system includes a means for identifying and extracting a single type of seismic signals from the seismic data received at the multi-component receiver utilizing the mask trace generated at section 305. In section 305, in one embodiment of the present invention, generating the mask trace further includes multiplying the seismic data received at two components of the multi-component receiver (for example, the pressure data and the vertical component velocity data) to produce a first result per block 315. At block 320, a positive/negative sign of the first result is identified to produce a first binary result and, at block 335, the first binary result is divided by a scaling factor to produce the mask trace. In section 310, identifying and extracting a single type of seismic signals from the seismic data received at the multi-component receiver further includes the step of multiplying the seismic data received at one component of the multi-component receiver with the mask trace, per block 340. The single type of seismic signals extracted represents seismic waves (for example, down-going seismic waves) received at the one component of the multi-component receiver.

At block 320, the step of identifying the positive/negative sign of the first result is generated on a sample-by-sample basis and can be performed by a number of methods know in the art, such as, for example, a FORTRAN instruction program that will return the sign of any value. Another method for identifying the positive/negative sign of the first result is taking the root mean square (rms) value of the first result to produce a first rms result. The first rms result is then set to a value of one. Therefore, each sample in the resultant trace is then either a positive one or a negative one. This trace is then summed with a value of positive one to produce a first positive/negative sign result such as a trace having samples of either positive/negative two or zero. The first positive/negative sign result is divided by a factor of two to obtain the binary result trace having either a positive/negative one or zero for each sample wherein the positive/negative sign of the first result is identified. This trace is then used to generate the mask traces according to the present invention. These seismic wave reflections can be compressional waves, shear waves or compressional to shear mode converted waves.

In another embodiment of the present invention, generating the mask trace further includes multiplying the seismic data received at two components of the multi-component receiver (for example, the vertical component velocity data and the horizontal component velocity data) to produce a second result per block 325. A positive/negative sign of the first result is identified to produce a second binary result per block 330. The second binary result is multiplied with the first binary result and then divided by a scaling factor at block 335 to produce the mask trace. Extracting the single type of seismic signals further includes multiplying the seismic data received at one component of the multicomponent receiver with the mask trace wherein the single type of seismic signals represents seismic waves received at the one component of the multi-component receiver. For example, in one embodiment, up-going compressional seismic waves received at each the component of the multi-component receiver are extracted, and, in another embodiment, up-going shear seismic waves received at each the component of the multicomponent receiver are extracted.

FIG. 2B is a flowchart illustrating an embodiment of the system and method of the present invention wherein the down-going seismic waves received at one component are extracted from the seismic data received at the multi-component receiver. Seismic data is obtained resulting from generating the reflected seismic wave and receiving the seismic wave at the multi-component receiver. At block 350, the seismic data comprises pressure data (defined as "H") received at a pressure sensor, such as a hydrophone, and at block 355, the seismic data comprises vertical component velocity data (defined as "V") received at a velocity detector having a vertical component, such as a geophone.

At section 360, the mask trace is generated as a function of the seismic data received at the multi-component receiver. At section 365, the single type of seismic signals from the seismic data received at the multi-component receiver are identified and extracted utilizing the mask trace generated at section 360. In section 360, generating the mask trace further includes multiplying the samples from the pressure data H and the vertical component velocity data V to produce a first result H*V trace at block 370. At block 375, a positive/negative sign of the first result H*V is identified to produce a binary result α. The binary result a is divided by a scaling factor at block 380 to produce the mask trace. For example, the binary result α is subtracted from a value of one and divided by a scaling factor of two (2) to produce the mask trace, defined as Total $_{DOWN}$ for the mask trace used in extracting the down-going seismic waves as follows:

Total $_{DOWN}$=½(1−α);

wherein α=H*V.

In section 365, identifying and extracting the down-going seismic signals from the seismic data received at the multi-component receiver further includes the step of multiplying the seismic data received at one component of the multi-component receiver with the mask trace Total $_{DOWN}$. At block 385, the mask trace Total $_{DOWN}$ is multiplied by the pressure data H received at the pressure sensor wherein the single type of seismic signals extracted represent down-going seismic waves received at the pressure sensor. The seismic signals remaining after the down-going seismic waves received at the pressure sensor are extracted are then displayed. At block 390, the mask trace Total $_{DOWN}$ is multiplied by the velocity data V received at the vertical component velocity detector wherein the single type of seismic signals extracted represent down-going seismic waves received at the vertical component velocity detector. The seismic signals remaining after the down-going seismic waves received at the vertical component velocity detector are extracted are then displayed.

FIG. 2C is a flowchart illustrating another embodiment of the system and method of the present invention wherein the up-going compressional seismic waves received at one component are extracted from the seismic data received at the multicomponent receiver. Seismic data is obtained resulting from generating the reflected seismic wave and receiving the seismic wave at the multi-component receiver. At block 400, the seismic data is the pressure data H received at the pressure sensor, such as the hydrophone, at block 405, the seismic data is the vertical component velocity data V received at the velocity detector having a vertical component, such as a vertical component geophone, and at block 410, the seismic data is the horizontal component velocity data (defined as "I") received at the velocity detector having a horizontal component, such as an in-line geophone.

At section 415, the mask trace is generated as a function of the seismic data received at the multi-component receiver. At section 420, the single type of seismic signals from the seismic data received at the multi-component receiver are identified and extracted utilizing the mask trace generated at section 415. In section 415, generating the mask trace further includes multiplying the samples from the pressure data H and the vertical component velocity data V to produce the first result H*V trace at block 425. At block 430, the positive/negative sign of the first result H*V is identified to produce the binary result α. At block 435, the samples from the vertical component velocity data V are multiplied with the samples from the horizontal component velocity data I to produce a second result V*I trace. At block 440, the positive/negative sign of the second result V*1 is identified to produce the binary result χ.

At block 430, the step of identifying the positive/negative sign of the first result is generated on a sample-by-sample basis and can be performed by a number of methods know in the art as described in FIG. 2A. At block 440, the step of identifying the positive/negative sign of the second result is also generated on a sample-by-sample basis and can be performed by a number of methods know in the art, such as, for example, the FORTRAN instruction program that returns the sign of any value. The positive/negative sign of the second result can also be identified by taking the root mean square (rms) value of the second result to produce a second rms result. The second rms result is then set to a value of one. Therefore, each sample in the resultant trace is then either a positive one or a negative one. This trace is then summed with a value of positive one to produce a second positive/negative sign result such as a trace having samples of either positive/negative two or zero. The second positive/negative sign result is divided by a factor of two to obtain the binary result trace having either a positive/negative one or zero for each sample wherein the positive/negative sign of the second result is identified.

The binary results α and χ are multiplied to produce a third result at block 445. For example, the binary result α is summed with a value of positive one to produce a summed binary result α (1+α) and the binary result χ is summed with a value of positive one to produce a summed binary result χ (1+χ), and then the summed binary result α is multiplied with the summed binary result χ to produce the third result (1+α)*(1+χ) per block 445. The third result (1+α)*(1+χ) is then divided by a scaling factor of four at block 450 to produce the mask trace, defined as $P_{UP}$ for the mask trace used in extracting the up-going compressional seismic waves as follows:

$P_{UP} = ¼(1+α)*(1+χ);$ wherein α=H*V ; and wherein χ=V*I.

In section 420, identifying and extracting the up-going compressional seismic signals from the seismic data received at the multi-component receiver further includes the step of multiplying the seismic data received at one component of the multicomponent receiver with the mask trace $P_{UP}$. At block 455, the mask trace $P_{UP}$ is multiplied by the pressure data H received at the pressure sensor wherein the single type of seismic signals extracted represent up-going compressional seismic waves received at the pressure sensor. The seismic signals remaining after the up-going compressional seismic waves received at the pressure sensor are extracted are then displayed. At block 460, the mask trace $P_{UP}$ is multiplied by the velocity data V received at the vertical component velocity detector wherein the single type of seismic signals extracted represent up-going compressional seismic waves received at the vertical component velocity detector. The seismic signals remaining after the up-going compressional seismic waves received at the vertical component velocity detector are extracted are then displayed. At block 465, the mask trace $P_{UP}$ is multiplied by the velocity data I received at the horizontal component velocity detector wherein the single type of seismic signals extracted represent up-going compressional seismic waves received at the horizontal component velocity detector. The seismic signals remaining after the up-going compressional seismic waves received at the horizontal component velocity detector are extracted are then displayed.

FIG. 2D is a flowchart illustrating still another embodiment of the system and method of the present invention wherein the up-going shear seismic waves received at one component are extracted from the seismic data received at the multi-component receiver. Seismic data is obtained resulting from generating the reflected seismic wave and receiving the seismic wave at the multi-component receiver. At block 500, the seismic data is the pressure data H received at the pressure sensor, such as the hydrophone, at block 505, the seismic data is the vertical component velocity data V received at the velocity detector having a vertical component, such as a vertical component geophone, and at block 510, the seismic data is the horizontal component velocity data (defined as "I") received at the velocity detector having a horizontal component, such as the in-line geophone.

At section 515, the mask trace is generated as a function of the seismic data received at the multi-component receiver. At section 520, the single type of seismic signals from the seismic data received at the multi-component receiver are identified and extracted utilizing the mask trace generated at section 515. In section 515, generating the mask trace further includes multiplying the samples from the pressure data H and the vertical component velocity data V to produce the first result H*V trace at block 525. At block 530, the positive/negative sign of the first result H*V is identified to produce the binary result α. At block 535, the samples from the vertical component velocity data V are multiplied with the samples from the horizontal component velocity data I to produce the second result V*I trace. At block 540, the positive/negative sign of the second result V*1 is identified to produce the binary result χ. The binary results are multiplied to produce the third result at block 545. For example, the binary result α is summed with a value of positive one to produce a summed binary result α (1+α) and the binary result χ is subtracted from a value of positive one to produce a subtracted binary result χ (1−χ), and then the summed binary result α is multiplied with the subtracted binary result χ to produce the third result (1+α)*(1−χ) per block 545. The third result (1+α)*(1−χ) is then divided by a scaling factor of four at block 550 to produce the mask trace, defined as $S_{UP}$ for the mask trace used in extracting the up-going shear seismic waves as follows:

$S_{UP} = ¼(1+α)*(1−χ);$ wherein α=H*V ; and wherein χ=V*H.

In section 520, identifying and extracting the up-going shear seismic signals from the seismic data received at the multi-component receiver further includes the step of multiplying the seismic data received at one component of the multi-component receiver with the mask trace $S_{UP}$. At block 555, the mask trace $S_{UP}$ is multiplied by the pressure data H received at the pressure sensor wherein the single type of seismic signals extracted represent up-going shear seismic waves received at the pressure sensor. The seismic signals remaining after the up-going shear seismic waves received at the pressure sensor are extracted are then displayed. At block 560, the mask trace $S_{UP}$ is multiplied by the velocity data V received at the vertical component velocity detector wherein the single type of seismic signals extracted represent up-going shear seismic waves received at the vertical component velocity detector. The seismic signals remaining after the up-going shear seismic waves received at the vertical component velocity detector are extracted are then displayed. At block 565, the mask trace $S_{UP}$ is multiplied by the velocity data I received at the horizontal component velocity detector wherein the single type of seismic signals extracted represent up-going shear seismic waves received at the horizontal component velocity detector. The seismic signals remaining after the up-going shear seismic waves received at the horizontal component velocity detector are extracted are then displayed.

The positive/negative signs of the products H*V and V*I to produce binary results $\alpha$ and $\chi$ for use in the mask trace equations are further described by the following:

when V, I, and H are all positive the binary result $\alpha$ is positive and the binary result $\chi$ is positive, and the mask trace equation $P_{UP}$ is a one (1), wherein the mask trace equations $S_{UP}$ and $Total_{DOWN}$ are zero;

when V, I, and H are all negative the binary result $\alpha$ is positive and the binary result $\chi$ is positive, and the mask trace equation $P_{UP}$ is a one (1), wherein the mask trace equations $S_{UP}$ and $Total_{DOWN}$ are zero;

when V and H are positive and I is negative the binary result $\alpha$ is positive and the binary result $\chi$ is negative, and the mask trace equation $S_{UP}$ is a one (1), wherein the mask trace equations $P_{UP}$ and $Total_{DOWN}$ are zero;

when V and H are negative and I is positive the binary result $\alpha$ is positive and the binary result $\chi$ is negative, and the mask trace equation $S_{UP}$ is a one (1), wherein the mask trace equations $P_{UP}$ and $Total_{DOWN}$ are zero;

when V and I are positive and H is negative the binary result $\alpha$ is negative and the binary result $\chi$ is positive, and the mask trace equation $Total_{DOWN}$ is a one (1), wherein the mask trace equations $P_{UP}$ and $S_{UP}$ are zero;

when V and I are negative and H is positive the binary result $\alpha$ is negative and the binary result $\chi$ is positive, and the mask trace equation $Total_{DOWN}$ is a one (1), wherein the mask trace equations $P_{UP}$ and $S_{UP}$ are zero;

when H and I are negative and V is positive the binary result $\alpha$ is negative and the binary result $\chi$ is negative, and the mask trace equation $Total_{DOWN}$ is a one (1), wherein the mask trace equations $P_{UP}$ and $S_{UP}$ are zero; and when H and I are positive and V is negative the binary result $\alpha$ is negative and the binary result $\chi$ is negative, and the mask trace equation $Total_{DOWN}$ is a one (1), wherein the mask trace equations $P_{UP}$ and $S_{UP}$ are zero.

Figure 3:
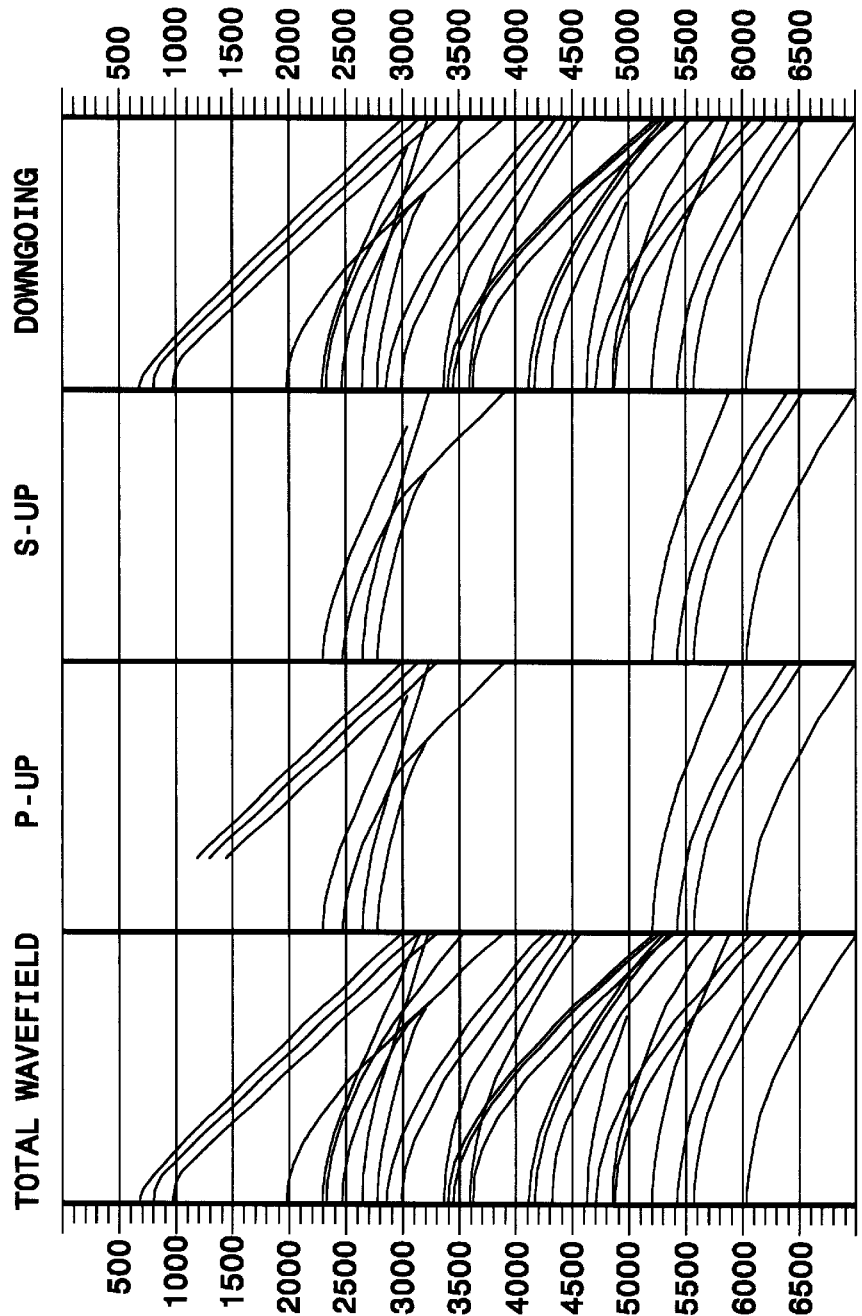
FIG. 3 is a gather illustrating the method of the present invention wherein the velocity data at the horizontal component geophone is extracted and displayed.
Figure 4:
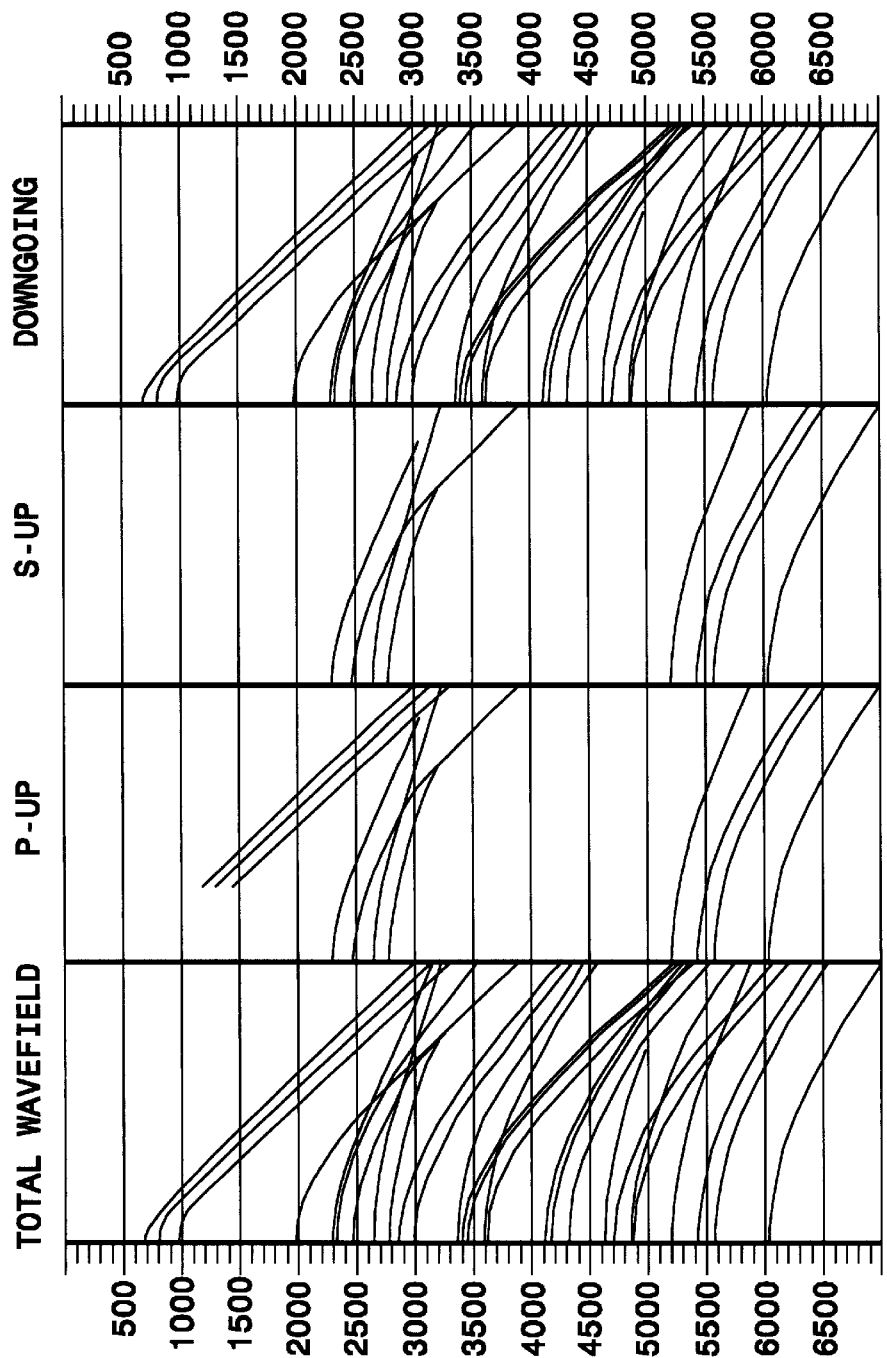
FIG. 4 is a gather illustrating the method of the present invention wherein the velocity data at the vertical component geophone is extracted and displayed.
Figure 5:
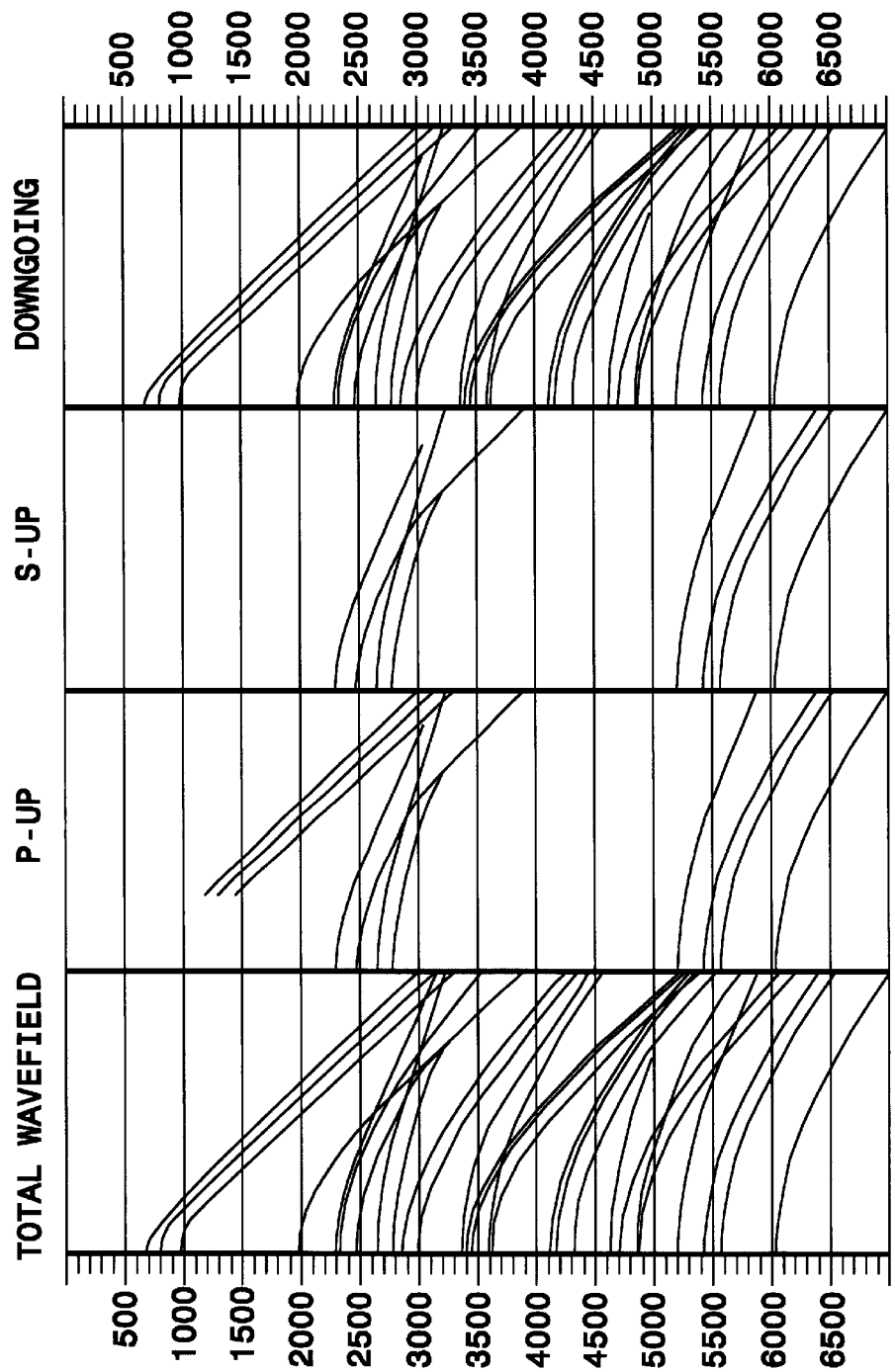
FIG. 5 is a gather illustrating the method of the present invention wherein the pressure data at the hydrophone is extracted and displayed.

The examples in FIGS. 3–5 illustrate the effectiveness of the system and method of the present invention at identifying and extracting a single type of seismic signal from the seismic reflection data. FIG. 3 is a common depth point (CDP) trace gather illustrating the method of the present invention wherein the velocity data at the vertical component geophone is extracted and displayed. In FIG. 3, Panel 1 illustrates all of the seismic data received at the multi-component receiver, Panel 2 illustrates the extracted up-going compressional wave seismic signals received at the vertical component geophone, Panel 3 illustrates the extracted up-going shear wave seismic signals received at the vertical component geophone, and Panel 4 illustrates the down-going seismic signals received at the vertical component geophone.

FIG. 4 is a common depth point (CDP) trace gather illustrating the method of the present invention wherein the pressure data at the hydrophone is extracted and displayed. In FIG. 4, Panel 1 illustrates all of the seismic data received at the multicomponent receiver, Panel 2 illustrates the extracted up-going compressional wave seismic signals received at the hydrophone, Panel 3 illustrates the extracted up-going shear wave seismic signals received at the hydrophone, and Panel 4 illustrates the downgoing seismic signals received at the hydrophone.

FIG. 5 is a common depth point (CDP) trace gather illustrating the method of the present invention wherein the velocity data at the horizontal component geophone is extracted and displayed. In FIG. 5, Panel 1 illustrates all of the seismic data received at the multi-component receiver, Panel 2 illustrates the extracted up-going compressional wave seismic signals received at the horizontal component geophone, Panel 3 illustrates the extracted up-going shear wave seismic signals received at the horizontal component geophone, and Panel 4 illustrates the down-going seismic signals received at the horizontal component geophone.

While preferred embodiments have been shown and described, various modifications and substitutions may be made thereto without departing from the spirit and scope of the invention and it should be understood that the invention is not limited to the particular forms disclosed. Those of skill in the art will recognize other embodiments, modifications, equivalents, and alternatives following within the spirit and scope of the invention as defined by the appended claims. Accordingly, it is to be understood that the present invention has been described by way of illustrations and not limitations.

What is claimed is:

1. A method for processing seismic signals, the method comprising:

reading seismic data received at a multi-component receiver;

generating a mask trace as a function of the seismic data; and identifying a single type of seismic signals from the seismic data utilizing the mask trace.

2. A method, as recited in claim 1, wherein the seismic data received at the multi-component receiver includes pressure data received at a pressure sensor and velocity data received at a vertical component velocity detector.

3. A method, as recited in claim 2, wherein the seismic data received at a multi-component receiver includes velocity data received at a horizontal component velocity detector.

4. A method, as recited in claim 2, wherein the generating the mask trace further comprises:

multiplying the seismic data received at the pressure sensor with the seismic data received at the vertical component velocity detector to produce a first result;

identifying a positive/negative sign of the first result to produce a first binary result; and dividing the first binary result by a scaling factor to produce the mask trace.

5. A method, as recited in claim 4, wherein the identifying the single type of seismic signals further comprises:

multiplying the pressure data received at the pressure sensor with the mask trace whereby the single type of seismic signals representing seismic waves received at the pressure sensor are extracted.

6. A method, as recited in claim 4, wherein the identifying the single type of seismic signals further comprises:

multiplying the velocity data received at the vertical component velocity detector with the mask trace whereby the single type of seismic signals representing seismic waves received at the vertical component velocity detector are extracted.

7. A method, as recited in claim 3, wherein the generating the mask trace further comprises:

multiplying the seismic data received at the pressure sensor with the seismic data received at the vertical component velocity detector to produce a first result;

identifying a positive/negative sign of the first result to produce a first binary result;

multiplying the seismic data received at the vertical component velocity detector with the seismic data received at the horizontal component velocity detector to produce a second result;

identifying a positive/negative sign of the second result to produce a second binary result;

multiplying the first binary result with the second binary result to produce a third result; and dividing the third result by a scaling factor to produce the mask trace.

8. A method, as recited in claim 7, wherein the identifying the single type of seismic signals further comprises:

multiplying the horizontal component velocity data received at the horizontal component velocity detector with the mask trace whereby the single type of seismic signals representing seismic waves received at the horizontal component velocity detector.

9. A method, as recited in claim 8, further comprising:

displaying the single type of seismic signals remaining after the seismic waves received at the horizontal component velocity detector are extracted.

10. A method, as recited in claim 7, wherein the identifying the single of seismic signals further comprises:

multiplying the pressure data received at the pressure sensor with the mask trace whereby the single type of seismic signals representing seismic waves received at the pressure sensor are extracted.

11. A method, as recited in claim 7, wherein the identifying the single type of seismic signals further comprises:

multiplying the velocity data received at the vertical component velocity detector with the mask trace whereby the single type of seismic signals representing seismic waves received at the vertical component velocity detector are extracted.

12. A method, as recited in claim 1, further comprising:

generating seismic waves in a water environment for reflection from earth strata wherein the seismic data results from the seismic waves.

13. A method, as recited in claim 1, wherein reading the seismic data further comprises:

receiving the seismic data from the multi-component receiver; and recording the seismic data by a multi-channel seismic recording system.

14. A method for extraction of down-going seismic waves, the method comprising:

reading seismic data received at a multi-component receiver including pressure data received at a pressure sensor and velocity data received at a vertical component velocity detector;

multiplying the pressure data and the velocity data to produce a first result;

identifying a positive/negative sign of the first result to produce a binary result $\alpha$;

dividing the binary result $\alpha$ by a scaling factor to produce a mask trace; and multiplying the seismic data received at one component of the multi-component receiver with the mask trace whereby the single type of seismic signals representing down-going seismic waves received at the one component of the multi-component receiver are extracted.

15. A method, as recited in claim 14, wherein the identifying the positive/negative sign of the first result further comprises:

taking the root mean square (rms) value of the first result to produce a first rms result;

setting the first rms result to a value of one;

summing the first rms result set to a value of one with a value of one to produce a first positive/negative sign result; and dividing the first positive/negative sign result by a factor of two to obtain the binary result $\alpha$.

16. A method, as recited in claim 14, wherein the seismic data received at the one component of the multi-component receiver is the pressure data received at the pressure sensor whereby the single type of seismic signals representing down-going seismic waves received at the pressure sensor are extracted.

17. A method, as recited in claim 14, wherein the seismic data received at the one component of the multi-component receiver is the velocity data received at the vertical component velocity detector whereby the single type of seismic signals representing down-going seismic waves received at the vertical component velocity detector are extracted.

18. A method, as recited in claim 17, further comprising:

displaying the single type of seismic signals remaining after the down-going seismic waves received at the vertical component velocity detector are extracted.

19. A method, as recited in claim 14, further comprising:

generating seismic waves in a water environment for reflection from earth strata wherein the seismic data results from the seismic waves.

20. A method, as recited in claim 14, wherein reading the seismic data further comprises:

receiving the seismic data from the multi-component receiver; and recording the seismic data by a multi-channel seismic recording system.

21. A method for extraction of up-going compressional seismic waves, the method comprising:

reading seismic data received at a multi-component receiver including pressure data received at a pressure sensor, vertical component velocity data received at a vertical component velocity detector, and horizontal component velocity data received at a horizontal component velocity detector;

multiplying the pressure data and the vertical component velocity data to produce a first result;

identifying a positive/negative sign of the first result to produce a binary result $\alpha$;

multiplying the vertical component velocity data and the horizontal component velocity data to produce a second result;

identifying a positive/negative sign of the second result to produce a binary result χ;

summing the binary result α with a value of positive one to produce a summed binary result α;

summing the binary result χ with a value of positive one to produce a summed binary result χ;

multiplying the summed binary result α with the summed binary result χ to produce a third result;

dividing the third result by a scaling factor of four to produce a mask trace; and multiplying the seismic data received at one component of the multi-component receiver with the mask trace wherein the method for processing extracts the single type of seismic signals representing the up-going compressional seismic waves received at the one component of the multi-component receiver.

22. A method, as recited in claim 21, wherein the identifying the positive/negative sign of the first result further comprises:

taking the root mean square (rms) value of the first result to produce a first rms result;

setting the first rms result to a value of one;

summing the first rms result set to a value of one with a value of one to produce a first positive/negative sign result; and dividing the first positive/negative sign result by a factor of two to obtain the binary result α.

23. A method, as recited in claim 22, wherein the identifying a positive/negative sign of the second result further comprises:

taking the root mean square (rms) value of the second result to produce a second rms result;

setting the second rms result to a value of one;

summing the second rms result set to a value of one with a value of one to produce a second positive/negative sign result; and dividing the second positive/negative sign result by a factor of two to obtain the binary result χ.

24. A method, as recited in claim 22, wherein the seismic data received at the one component of the multi-component receiver is the pressure data received at the pressure sensor whereby the single type of seismic signals representing up-going compressional seismic waves received at the pressure sensor is extracted.

25. A method, as recited in claim 22, wherein the seismic data received at the one component of the multi-component receiver is the vertical component velocity data received at the vertical component velocity detector whereby the single type of seismic signals representing up-going compressional seismic waves received at the vertical component velocity detector is extracted.

26. A method, as recited in claim 22, wherein the seismic data received at the one component of the multi-component receiver is the horizontal component velocity data received at the horizontal component velocity detector whereby the single type of seismic signals representing up-going compressional seismic waves received at the horizontal component velocity detector.

27. A method, as recited in claim 22, wherein reading the seismic data further comprises:

receiving the seismic data from the multi-component receiver; and recording the seismic data by a multi-channel seismic recording system.

28. A method for processing seismic signals for extraction of up-going shear seismic waves, the method comprising:

reading seismic data received at a multi-component receiver including pressure data received at a pressure sensor, vertical component velocity data received at a vertical component velocity detector, and horizontal component velocity data received at a horizontal component velocity detector;

multiplying the pressure data and the vertical component velocity data to produce a first result;

identifying a positive/negative sign of the first result to produce a binary result α;

multiplying the vertical component velocity data and the horizontal component velocity data to produce a second result;

identifying a positive/negative sign of the second result to produce a binary result χ;

summing the binary result α with a value of positive one to produce a summed binary result α;

subtracting the binary result χ from a value of positive one to produce a subtracted binary result χ;

multiplying the summed binary result α with the subtracted binary result χ to produce a third result;

dividing the third result by a scaling factor of four to produce a mask trace; and multiplying the seismic data received at one component of the multi-component receiver with the mask trace wherein the method for processing extracts the single type of seismic signals representing the up-going shear seismic waves received at the one component of the multi-component receiver.

29. A method, as recited in claim 28, wherein the identifying the positive/negative sign of the first result further comprises:

taking the root mean square (rms) value of the first result to produce a first rms result;

setting the first rms result to a value of one;

summing the first rms result set to a value of one with a value of one to produce a first positive/negative sign result; and dividing the first positive/negative sign result by a factor of two to obtain the binary result α.

30. A method, as recited in claim 28, wherein the identifying a positive/negative sign of the second result further comprises:

taking the root mean square (rms) value of the second result to produce a second rms result;

setting the second rms result to a value of one;

summing the second rms result set to a value of one with a value of one to produce a second positive/negative sign result; and dividing the second positive/negative sign result by a factor of two to obtain the binary result χ.

31. A method, as recited in claim 28, wherein the seismic data received at the one component of the multi-component receiver is the pressure data received at the pressure sensor whereby the single type of seismic signals representing up-going shear seismic waves received at the pressure sensor is extracted.

32. A method, as recited in claim 28, wherein the seismic data received at the one component of the multi-component receiver is the vertical component velocity data received at the vertical component velocity detector whereby the single type of seismic signals representing up-going shear seismic waves received at the vertical component velocity detector is extracted.

33. A method, as recited in claim 32, further comprising:
displaying the single type of seismic signals remaining after the up-going shear seismic waves received at the vertical component velocity detector are extracted.

34. A method, as recited in claim 28, wherein the seismic data received at the one component of the multi-component receiver is the horizontal component velocity data received at the horizontal component velocity detector whereby the single type of seismic signals representing up-going shear seismic waves received at the horizontal component velocity detector is extracted.

35. A method, as recited in claim 28, wherein reading the seismic data further comprises:
receiving the seismic data from the multi-component receiver; and
recording the seismic data by a multi-channel seismic recording system.

36. A system for processing seismic signals, the system comprising:
a means for reading seismic data received at a multi-component receiver;
a means for generating a mask trace as a function of the seismic data; and
a means for identifying a single type of seismic signals from the seismic data utilizing the mask trace.

37. A system, as recited in claim 36, wherein the seismic data received at a multi-component receiver includes pressure data received at a pressure sensor and velocity data received at a vertical component velocity detector.

38. A system, as recited in claim 37, wherein the seismic data received at a multi-component receiver includes velocity data received at a horizontal component velocity detector.

39. A system, as recited in claim 37, wherein the means for generating the mask trace further comprises:
a means for multiplying the seismic data received at the pressure sensor with the seismic data received at the vertical component velocity detector to produce a first result;
a means for identifying a positive/negative sign of the first result to produce a first binary result; and
a means for dividing the first binary result by a scaling factor to produce the mask trace.

40. A system, as recited in claim 39, wherein the means for identifying the single type of seismic signals further comprises:
a means for multiplying the pressure data received at the pressure sensor with the mask trace wherein the system for processing extracts the single type of seismic signals representing seismic waves received at the pressure sensor.

41. A system, as recited in claim 40, further comprising:
a means for displaying the single type of seismic signals remaining after the seismic waves received at the pressure sensor are extracted.

42. A system, as recited in claim 39, wherein the means for identifying the single type of seismic signals further comprises:
a means for multiplying the velocity data received at the vertical component velocity detector with the mask trace wherein the system for processing extracts the single type of seismic signals representing seismic waves received at the vertical component velocity detector.

43. A system, as recited in claim 38, wherein the means for generating the mask trace further comprises:
a means for multiplying the seismic data received at the pressure sensor with the seismic data received at the vertical component velocity detector to produce a first result;
a means for identifying a positive/negative sign of the first result to produce a first binary result;
a means for multiplying the seismic data received at the vertical component velocity detector with the seismic data received at the horizontal component velocity detector to produce a second result;
a means for identifying a positive/negative sign of the second result to produce a second binary result;
a means for multiplying the first binary result with the second binary result to produce a third result; and
a means for dividing the third result by a scaling factor to produce the mask trace.

44. A system, as recited in claim 43, wherein the means for identifying the single type of seismic signals further comprises:
a means for multiplying the velocity data received at the horizontal component velocity detector with the mask trace wherein the system for processing extracts the single type of seismic signals representing seismic waves received at the horizontal component velocity detector.

45. A system, as recited in claim 43, wherein the means for identifying the single type of seismic signals further comprises:
a means for multiplying the pressure data received at the pressure sensor with the mask trace wherein the system for processing extracts the single type of seismic signals representing seismic waves received at the pressure sensor.

46. A system, as recited in claim 43, wherein the means for identifying the single type of seismic signals further comprises:
a means for multiplying the velocity data received at the vertical component velocity detector with the mask trace wherein the system for processing extracts the single type of seismic signals representing seismic waves received at the vertical component velocity detector.

47. A system, as recited in claim 36, further comprising:
a means for generating seismic waves in a water environment for reflection from earth strata wherein the seismic data results from the seismic waves.

48. A system, as recited in claim 36, wherein the means for reading the seismic data further comprises:
a means for receiving the seismic data from the multi-component receiver; and
a means for recording the seismic data by a multi-channel seismic recording system.

49. A system for processing seismic signals for extraction of down-going seismic waves, the system comprising:
a means for reading seismic data received at a multi-component receiver including pressure data received at a pressure sensor and velocity data received at a vertical component velocity detector;
a means for multiplying the pressure data and the velocity data to produce a first result;
a means for identifying a positive/negative sign of the first result to produce a binary result $\alpha$;
a means for dividing the binary result $\alpha$ by a scaling factor to produce a mask trace; and a means for multiplying the seismic data received at one component of the multicomponent receiver with the mask trace wherein the system for processing extracts the single type of seismic signals representing down-going seismic waves received at the one component of the multi-component receiver.

50. A system, as recited in claim 49, wherein the means for identifying the positive/negative sign of the first result further comprises:

a means for taking the root mean square (rms) value of the first result to produce a first rms result;

a means for setting the first rms result to a value of one;

a means for summing the first rms result set to a value of one with a value of one to produce a first positive/negative sign result; and a means for dividing the first positive/negative sign result by a factor of two to obtain the binary result $\alpha$.

51. A system, as recited in claim 49, wherein the seismic data received at the one component of the multi-component receiver is the pressure data received at the pressure sensor wherein the system for processing extracts the single type of seismic signals representing down-going seismic waves received at the pressure sensor.

52. A system, as recited in claim 51, further comprising:

a means for displaying the single type of seismic signals remaining after the down-going seismic waves received at the pressure sensor are extracted.

53. A system, as recited in claim 49, wherein the seismic data received at the one component of the multi-component receiver is the velocity data received at the vertical component velocity detector wherein the system for processing extracts the single type of seismic signals representing down-going seismic waves received at the vertical component velocity detector.

54. A system, as recited in claim 49, further comprising:

a means for generating seismic waves in a water environment for reflection from earth strata wherein the seismic data results from the seismic waves.

55. A system, as recited in claim 49, wherein the means for reading the seismic data further comprises:

a means for receiving the seismic data from the multi-component receiver; and a means for recording the seismic data by a multi-channel seismic recording system.

56. A system for processing seismic signals for extraction of up-going compressional seismic waves, the system comprising:

a means for reading seismic data received at a multi-component receiver including pressure data received at a pressure sensor, vertical component velocity data received at a vertical component velocity detector, and horizontal component velocity data received at a horizontal component velocity detector;

a means for multiplying the pressure data and the vertical component velocity data to produce a first result;

a means for identifying a positive/negative sign of the first result to produce a binary result $\alpha$;

a means for multiplying the vertical component velocity data and the horizontal component velocity data to produce a second result;

a means for identifying a positive/negative sign of the second result to produce a binary result $\chi$;

a means for summing the binary result $\alpha$ with a value of positive one to produce a summed binary result $\alpha$;

a means for summing the binary result $\chi$ with a value of positive one to produce a summed binary result $\chi$;

a means for multiplying the summed binary result $\alpha$ with the summed binary result $\chi$ to produce a third result;

a means for dividing the third result by a scaling factor of four to produce a mask trace; and a means for multiplying the seismic data received at one component of the multicomponent receiver with the mask trace wherein the system for processing extracts the single type of seismic signals representing the up-going compressional seismic waves received at the one component of the multicomponent receiver.

57. A system, as recited in claim 56, wherein the means for identifying the positive/negative sign of the first result further comprises:

a means for taking the root mean square (rms) value of the first result to produce a first rms result;

a means for setting the first rms result to a value of one;

a means for summing the first rms result set to a value of one with a value of one to produce a first positive/negative sign result; and a means for dividing the first positive/negative sign result by a factor of two to obtain the binary result $\alpha$.

58. A system, as recited in claim 56, wherein the means for identifying a positive/negative sign of the second result further comprises:

a means for taking the root mean square (rms) value of the second result to produce a second rms result;

a means for setting the second rms result to a value of one;

a means for summing the second rms result set to a value of one with a value of one to produce a second positive/negative sign result; and a means for dividing the second positive/negative sign result by a factor of two to obtain the binary result $\chi$.

59. A system, as recited in claim 56, wherein the seismic data received at the one component of the multi-component receiver is the pressure data received at the pressure sensor wherein the system for processing extracts the single type of seismic signals representing up-going compressional seismic waves received at the pressure sensor.

60. A system, as recited in claim 59, further comprising:

a means for displaying the single type of seismic signals remaining after the upgoing compressional seismic waves received at the pressure sensor are extracted.

61. A system, as recited in claim 56, wherein the seismic data received at the one component of the multi-component receiver is the vertical component velocity data received at the vertical component velocity detector wherein the system for processing extracts the single type of seismic signals representing up-going compressional seismic waves received at the vertical component velocity detector.

62. A system, as recited in claim 56, wherein the seismic data received at the one component of the multi-component receiver is the horizontal component velocity data received at the horizontal component velocity detector wherein the system for processing extracts the single type of seismic signals representing up-going compressional seismic waves received at the horizontal component velocity detector.

63. A system, as recited in claim 56, further comprising:

a means for generating seismic waves in a water environment for reflection from earth strata wherein the seismic data results from the seismic waves.

64. A system, as recited in claim 56, wherein the means for reading the seismic data further comprises:

a means for receiving the seismic data from the multi-component receiver; and a means for recording the seismic data by a multi-channel seismic recording system.

65. A system for processing seismic signals for extraction of up-going shear seismic waves, the system comprising:
- a means for reading seismic data received at a multi-component receiver including pressure data received at a pressure sensor, vertical component velocity data received at a vertical component velocity detector, and horizontal component velocity data received at a horizontal component velocity detector;
- a means for multiplying the pressure data and the vertical component velocity data to produce a first result;
- a means for identifying a positive/negative sign of the first result to produce a binary result $\alpha$;
- a means for multiplying the vertical component velocity data and the horizontal component velocity data to produce a second result;
- a means for identifying a positive/negative sign of the second result to produce a binary result $\chi$;
- a means for summing the binary result a with a value of positive one to produce a summed binary result $\alpha$;
- a means for subtracting the binary result $\chi$ from a value of positive one to produce a subtracted binary result $\chi$;
- a means for multiplying the summed binary result a with the subtracted binary result $\chi$ to produce a third result;
- a means for dividing the third result by a scaling factor of four to produce a mask trace; and
- a means for multiplying the seismic data received at one component of the multicomponent receiver with the mask trace wherein the system for processing extracts the single type of seismic signals representing the up-going shear seismic waves received at the one component of the multi-component receiver.

66. A system, as recited in claim 65, wherein the means for identifying the positive/negative sign of the first result further comprises:
- a means for taking the root mean square (rms) value of the first result to produce a first rms result;
- a means for setting the first rms result to a value of one;
- a means for summing the first rms result set to a value of one with a value of one to produce a first positive/negative sign result; and
- a means for dividing the first positive/negative sign result by a factor of two to obtain the binary result $\alpha$.

67. A system, as recited in claim 65, wherein the means for identifying a positive/negative sign of the second result further comprises:
- a means for taking the root mean square (rms) value of the second result to produce a second rms result;
- a means for setting the second rms result to a value of one;
- a means for summing the second rms result set to a value of one with a value of one to produce a second positive/negative sign result; and
- a means for dividing the second positive/negative sign result by a factor of two to obtain the binary result $\chi$.

68. A system, as recited in claim 65, wherein the seismic data received at the one component of the multi-component receiver is the pressure data received at the pressure sensor wherein the system for processing extracts the single type of seismic signals representing up-going shear seismic waves received at the pressure sensor.

69. A system, as recited in claim 68 further comprising:
- a means for displaying the single type of seismic signals remaining after the upgoing shear seismic waves received at the pressure sensor are extracted.

70. A system, as recited in claim 65, wherein the seismic data received at the one component of the multi-component receiver is the vertical component velocity data received at the vertical component velocity detector wherein the system for processing extracts the single type of seismic signals representing up-going shear seismic waves received at the vertical component velocity detector.

71. A system, as recited in claim 65, wherein the seismic data received at the one component of the multi-component receiver is the horizontal component velocity data received at the horizontal component velocity detector wherein the system for processing extracts the single type of seismic signals representing up-going shear seismic waves received at the horizontal component velocity detector.

72. A system, as recited in claim 65, further comprising:
- a means for generating seismic waves in a water environment for reflection from earth strata wherein the seismic data results from the seismic waves.

73. A system, as recited in claim 65, wherein the means for reading the seismic data further comprises:
- a means for receiving the seismic data from the multi-component receiver; and
- a means for recording the seismic data by a multi-channel seismic recording system.

* * * * *

UNITED STATES PATENT AND TRADEMARK OFFICE
CERTIFICATE OF CORRECTION

PATENT NO.   : 6,246,637 B1
DATED        : June 12, 2001
INVENTOR(S)  : Gidlow, Maurice It is certified that error appears in the above-identified patent and that said Letters Patent is hereby corrected as shown below:

Column 1,
Line 6, "exploration and, more particularly to" should read -- exploration, and more particularly, to --

Column 6,
Line 10, "As still a further alternatively," should read -- In still a further embodiment, --
Line 17, "alternatives, is a" should read -- alternatives, a --
Line 22, "signals, the" should read -- signals is provided, the --
Line 54, "alternative, a" should read -- alternative embodiment, a --

Column 8,
Line 18, "example, of the" should read -- example, the --

Column 10,
Line 37, "alternative, is" should read -- alternative, there is --

Column 11,
Line 30, "Also in" should read -- Also, in --

Column 13,
Line 23, "method know" should read -- method known --

Column 14,
Line 18, "result a is" should read -- result $\alpha$ is --

Column 15,
Line 10, "V*1" should read -- V*I --
Lines 14 and 18, "know" should read -- known --
Line 41, "four at block 450 to" should read -- four to --

Column 16,
Line 42, "V*1" should read -- V*I --
Line 52, "four at block 550 to" should read -- four to --
Line 59, "wherein $\chi$=V*H" should read -- wherein $\chi$=V*I --

UNITED STATES PATENT AND TRADEMARK OFFICE
CERTIFICATE OF CORRECTION

PATENT NO. : 6,246,637 B1
DATED : June 12, 2001
INVENTOR(S) : Gidlow, Maurice

It is certified that error appears in the above-identified patent and that said Letters Patent is hereby corrected as shown below:

Column 17,
Lines 24, 28, 32, 37, 41, 45, 49 and 54, "result$\chi$" should read -- result $\chi$ --

Column 27,
Line 19, "a with a" should read -- $\alpha$ with a --
Line 23, "result a" should read -- result $\alpha$ --

Signed and Sealed this

Second Day of April, 2002

Attest:

JAMES E. ROGAN
Attesting Officer
Director of the United States Patent and Trademark Office